US012762385B2

(12) United States Patent
Mills et al.

(10) Patent No.: US 12,762,385 B2
(45) Date of Patent: Oct. 13, 2026

(54) REDUCTION OPERATION WITH RETENTION IN NEURAL NETWORK PROCESSOR

(71) Applicant: Apple Inc., Cupertino, CA (US)

(72) Inventors: Christopher L. Mills, Saratoga, CA (US); Youchang Kim, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 1084 days.

(21) Appl. No.: 17/505,426

(22) Filed: Oct. 19, 2021

(65) Prior Publication Data

US 2023/0121448 A1 Apr. 20, 2023

(51) Int. Cl.

*G06N 3/063* (2023.01)
*G06F 17/15* (2006.01)
*G06N 3/045* (2023.01)
*G06N 3/0464* (2023.01)

(52) U.S. Cl.

CPC ........... *G06N 3/063* (2013.01); *G06F 17/153* (2013.01); *G06N 3/045* (2023.01); *G06N 3/0464* (2023.01)

(58) Field of Classification Search

CPC ..................................................... G06F 17/153
USPC ..................................................... 706/33, 41
See application file for complete search history.

(56) References Cited

U.S. PATENT DOCUMENTS 10,073,816 B1 9/2018 Lu et al.
10,411,709 B1 * 9/2019 Ghasemi ................ G06N 3/045
10,635,739 B1 * 4/2020 Batruni .................. G06N 20/00
11,003,429 B1 5/2021 Zejda et al.
(Continued)

FOREIGN PATENT DOCUMENTS

WO WO 2019/150067 A2 8/2019
WO WO-2021241460 A1 * 12/2021 ............ G06F 17/10

OTHER PUBLICATIONS

F. Tu, W. Wu, S. Yin, L. Liu and S. Wei, "RANA: Towards Efficient Neural Acceleration with Refresh-Optimized Embedded DRAM," 2018 ACM/IEEE 45th Annual International Symposium on Computer Architecture (ISCA), Los Angeles, CA, USA, 2018, pp. 340-352. (Year: 2018).*

L. Bai, Y. Zhao and X. Huang, "A Cnn Accelerator on FPGA Using Depthwise Separable Convolution," in IEEE Transactions on Circuits and Systems II: Express Briefs, vol. 65, No. 10, pp. 1415-1419, Oct. 2018. (Year: 2018).*

(Continued)

*Primary Examiner* — James Trujillo
*Assistant Examiner* — Markus Anthony Villanueva
(74) *Attorney, Agent, or Firm* — Sterne, Kessler, Goldstein & Fox P.L.L.C.

(57) ABSTRACT

Embodiments of the present disclosure relate to a reduction operation in a neural processor circuit where results of the reduction operation are retained for multiple post-processing operations. The neural processor circuit includes neural engine circuits and a planar engine circuit coupled to the neural engine circuits. At least one neural engine circuit performs a convolution operation to generate output data. The planar engine circuit includes a filter circuit and a line buffer coupled to the filter circuit. The filter circuit performs a reduction operation for each patch of a tensor from the output data to generate a respective reduced value associated with a corresponding channel of the tensor. The line buffer stores reduced values each being associated with a respective channel of the tensor. The line buffer retains the reduced values for a defined number of operating cycles as indicated by a refresh flag defining resetting of the line buffer.

20 Claims, 9 Drawing Sheets

(56) References Cited

U.S. PATENT DOCUMENTS

| | | | | |
|---|---|---|---|---|
| 11,222,256 | B2 | 1/2022 | Teng et al. | |
| 11,468,145 | B1 * | 10/2022 | Duong | G06F 17/16 |
| 2017/0372202 | A1 | 12/2017 | Ginsburg et al. | |
| 2019/0102671 | A1 | 4/2019 | Cohen et al. | |
| 2019/0340501 | A1 | 11/2019 | Mills | |
| 2019/0392287 | A1 | 12/2019 | Ovsiannikov et al. | |
| 2020/0073581 | A1 | 3/2020 | Croxford | |
| 2020/0175338 | A1 | 6/2020 | Croxford et al. | |
| 2020/0401895 | A1 | 12/2020 | Litvak et al. | |
| 2020/0409664 | A1 | 12/2020 | Li et al. | |
| 2021/0117815 | A1 | 4/2021 | Creed et al. | |
| 2021/0158135 | A1 | 5/2021 | Mills et al. | |
| 2021/0319317 | A1 * | 10/2021 | Power | G06F 17/153 |
| 2021/0334142 | A1 * | 10/2021 | Wang | G06N 3/063 |
| 2022/0012513 | A1 * | 1/2022 | Balasubramaniyan | G06F 17/153 |
| 2022/0044109 | A1 * | 2/2022 | Donnelly | G06N 3/04 |
| 2022/0108156 | A1 * | 4/2022 | Hunter | G06N 3/045 |
| 2023/0236984 | A1 * | 7/2023 | Katchi | G06F 12/0207 711/125 |

OTHER PUBLICATIONS

Helge M. Mortensen, "Designing a Low-Cost Terminal with LSI Chips", Digital Design The Magazine of Systems Electronics—Quantitative Evaluation of Soft Copy Displays, vol. 9, No. 6, Jun. 1979. p. 30-32, 34, 36, 38, 40. (Year: 1979).*

A. Ahmad and M. A. Pasha, "Optimizing Hardware Accelerated General Matrix-Matrix Multiplication for CNNs on FPGAs," in IEEE Transactions on Circuits and Systems II: Express Briefs, vol. 67, No. 11, pp. 2692-2696, Nov. 2020, doi: 10.1109/TCSII.2020.2965154. (Year: 2020).*

United States Office Action, U.S. Appl. No. 16/695,782, filed Apr. 25, 2022, 11 pages.

* cited by examiner

REDUCTION OPERATION WITH RETENTION IN NEURAL NETWORK PROCESSOR

BACKGROUND

1. Field of the Disclosure

The present disclosure relates to a circuit for performing operations related to neural networks, and more specifically to a reduction operation with retention in a neural network processor.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to a reduction of a rank of a tensor in a neural processor circuit where a result of a reduction operation is retained for multiple post-processing operations. The neural processor circuit includes multiple neural engine circuits and a planar engine circuit coupled to the neural engine circuits. At least one of the neural engine circuits performs a convolution operation to generate output data. The planar engine circuit includes a filter circuit and a line buffer coupled to the filter circuit. The filter circuit performs a reduction operation for each patch of a tensor from the output data to generate a respective reduced value of multiple reduced values that is associated with a corresponding channel of multiple channels of the tensor. The line buffer stores the reduced values, and retains the reduced values for a defined number of operating cycles as indicated by a refresh flag defining resetting of the line buffer.

Figure 1:
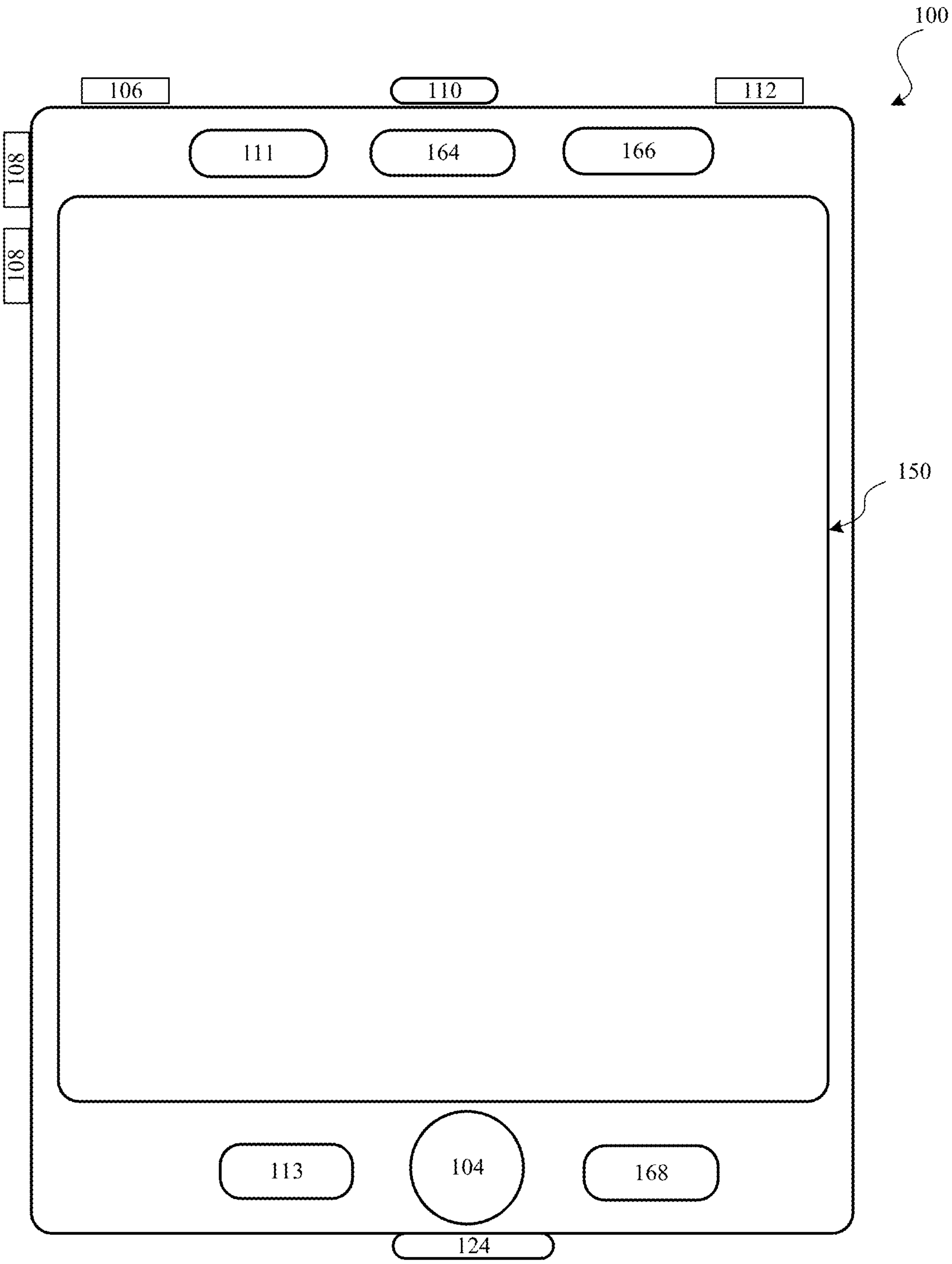
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to performing, in a neural processor circuit, a reduction of dimensions of source data (e.g., a rank of tensor) where reduced values obtained by the reduction operation are retained to be reused for more than one post-processing operation. The reduced values are retained in a link buffer of the neural processor circuit for a defined number of operating cycles (e.g., clock cycles) in accordance with a value of a refresh flag that configures refreshing of the link buffer. In this manner, the retained reduced values can be reused for multiple post-processing operations that follow the reduction operation. A first value of the refresh flag (e.g., bit value of "1") indicates that the link buffer storing the reduced values should not be initialized for the defined number of operating cycles, e.g., until the post-processing operations are finished with reusing the reduced values. In one or more embodiments, the reduction operation is part of an Arg Max/Min operation that is applied on the source data (e.g., tensor). In one or more other embodiments, the reduction operation is part of a summation operation that is applied on the source data (e.g., tensor).

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions.

Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
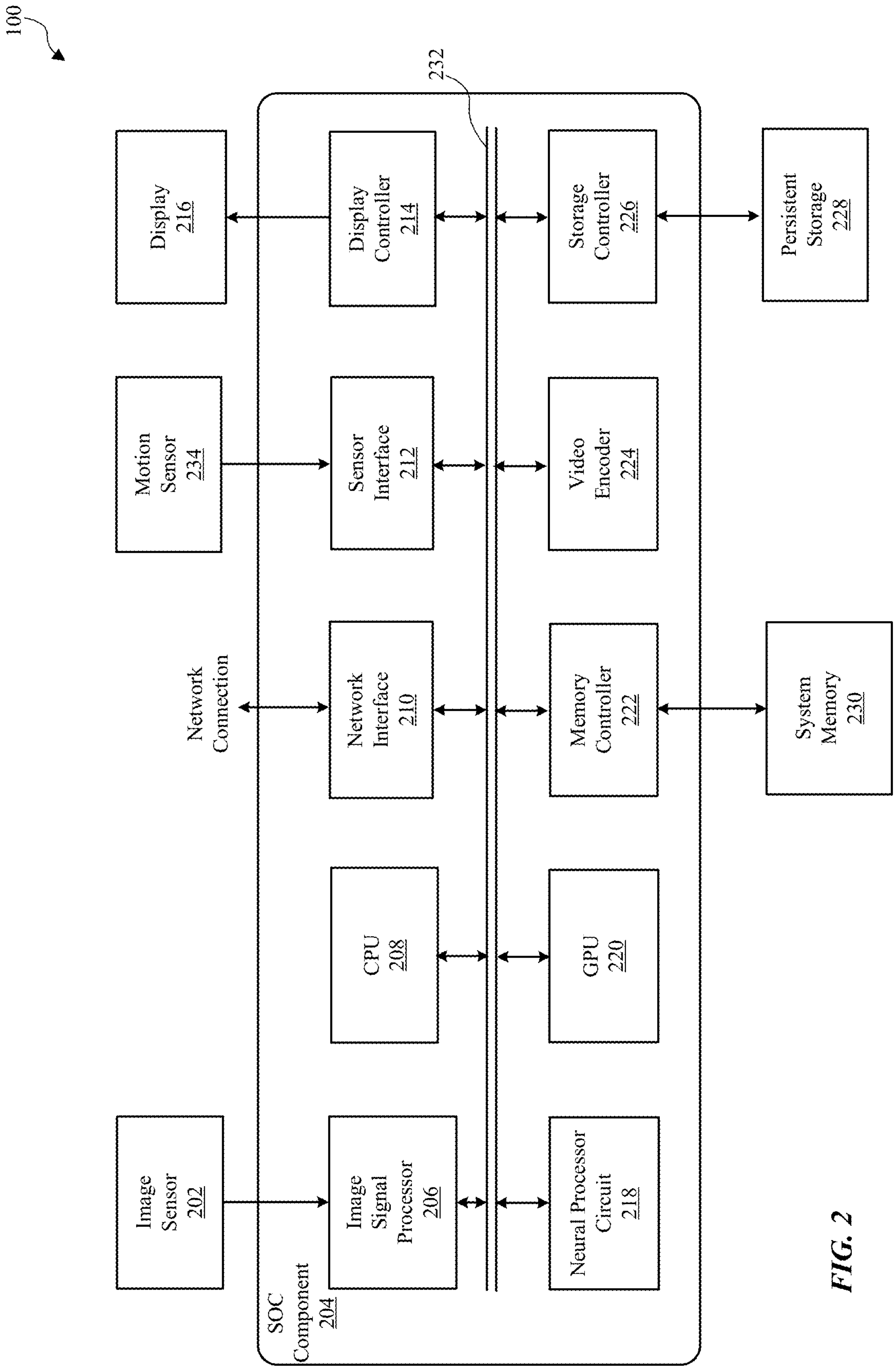
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tan h), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, neural processor circuit 218 may also be used for the operations of other types of machine learning models, such as a kernel SVM.

Figure 3:
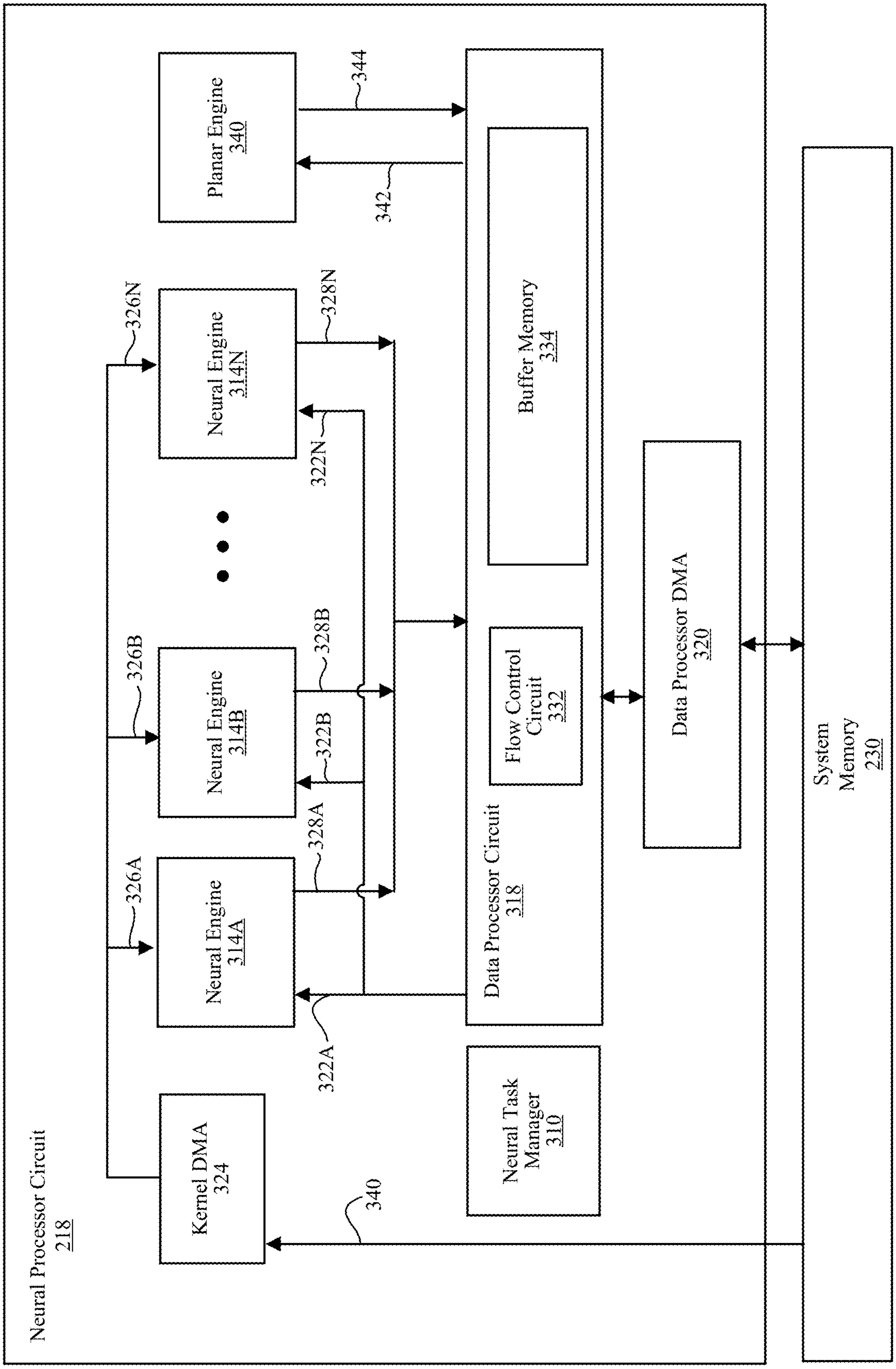
FIG. 3 is a block diagram illustrating a neural processor circuit, according to one embodiment.

Referring to FIG. 3, an example neural processor circuit 218 may include, among other components, a neural task manager 310, neural engines 314A through 314N (hereinafter collectively referred as "neural engines 314" and individually also referred to as "neural engine 314"), a kernel direct memory access (DMA) 324, a data processor circuit 318, a data processor DMA 320, and a planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduces a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of neural processor circuit 218 for performing the chosen task. Data may be associated with a task command that indicates the types of operations to be performed on the data. Data of neural processor circuit 218 includes input data that is transmitted from another source such as system memory 230, and data generated by neural processor circuit 218 in a previous operating cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by neural processor circuit 218. Although neural task manager 310 is illustrated in FIG. 3 as part of neural processor circuit 218, neural task manager 310 may be a component outside neural processor circuit 218.

Kernel DMA 324 is a read circuit that fetches kernel data from a source (e.g., system memory 230) and sends kernel data 326A through 326N to each of neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328N of neural engines 314 are used as input data 342 to planar engine 340. Likewise, output data 344 of planar engine 340 may be used as input data 322A through 322N of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous operating cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to planar engine 340 to direct planar engine 340 to program itself for operating in one of multiple operation modes.

The data of neural processor circuit 218 stored in buffer memory 334 may be part of, among others, image data, histogram of oriented gradients (HOG) data, audio data, metadata, output data 328 of a previous operating cycle of neural engine 314, and other processed data received from other components of SOC component 204.

Data processor DMA 320 includes a read circuit that receives a segment of the input data from a source (e.g., system memory 230) for storing in buffer memory 334, and a write circuit that forwards data from buffer memory 334 to a target component (e.g., system memory 230). In one embodiment, the direct memory access nature of data processor DMA 320 may allow data processor DMA 320 to fetch and write data directly from a source (e.g., system memory 230) without the involvement of CPU 208. Buffer memory 334 may be a direct memory access buffer that stores data of a machine learning model of device 100 without involvement of CPU 208.

Example Neural Engine Architecture

Figure 4:
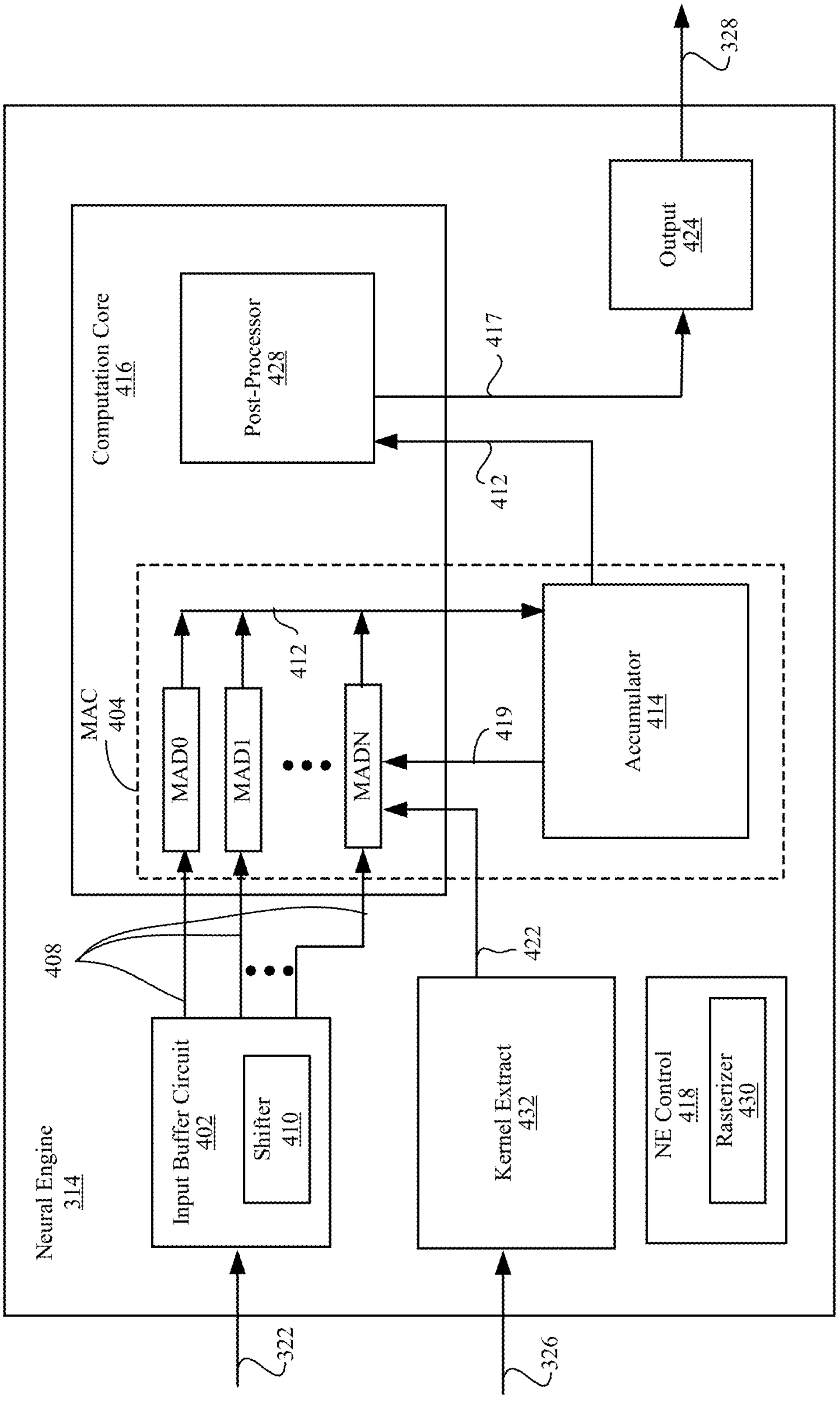
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that receives and stores processed values 412 from MAD circuits. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404. In one or more embodiments, accumulator circuit 414 may have subunits (or batches) where each subunit sends data to different components of neural engine 314. For example, during an operating cycle, data stored in a first subunit of accumulator circuit 414 is sent to MAC 404 while data stored in a second subunit of accumulator circuit 414 is sent to post-processor 428.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed during a prior operating cycle of neural engines 314 having a size that produces output values that fit into accumulator circuit 414 of neural engine 314 during a single operating cycle of computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior operating cycle of planar engine 340 that can be processed simultaneously at planar engine 340.

Rasterizer 430 may perform the operations associated with dividing the input data into smaller units (segments) and regulate the processing of the smaller units through MACs 404 and accumulator circuit 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer memory 334. Other components of neural processor circuit 218 (e.g., kernel DMA 324, buffer DMA 320, buffer memory 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Planar Engine

Figure 5:
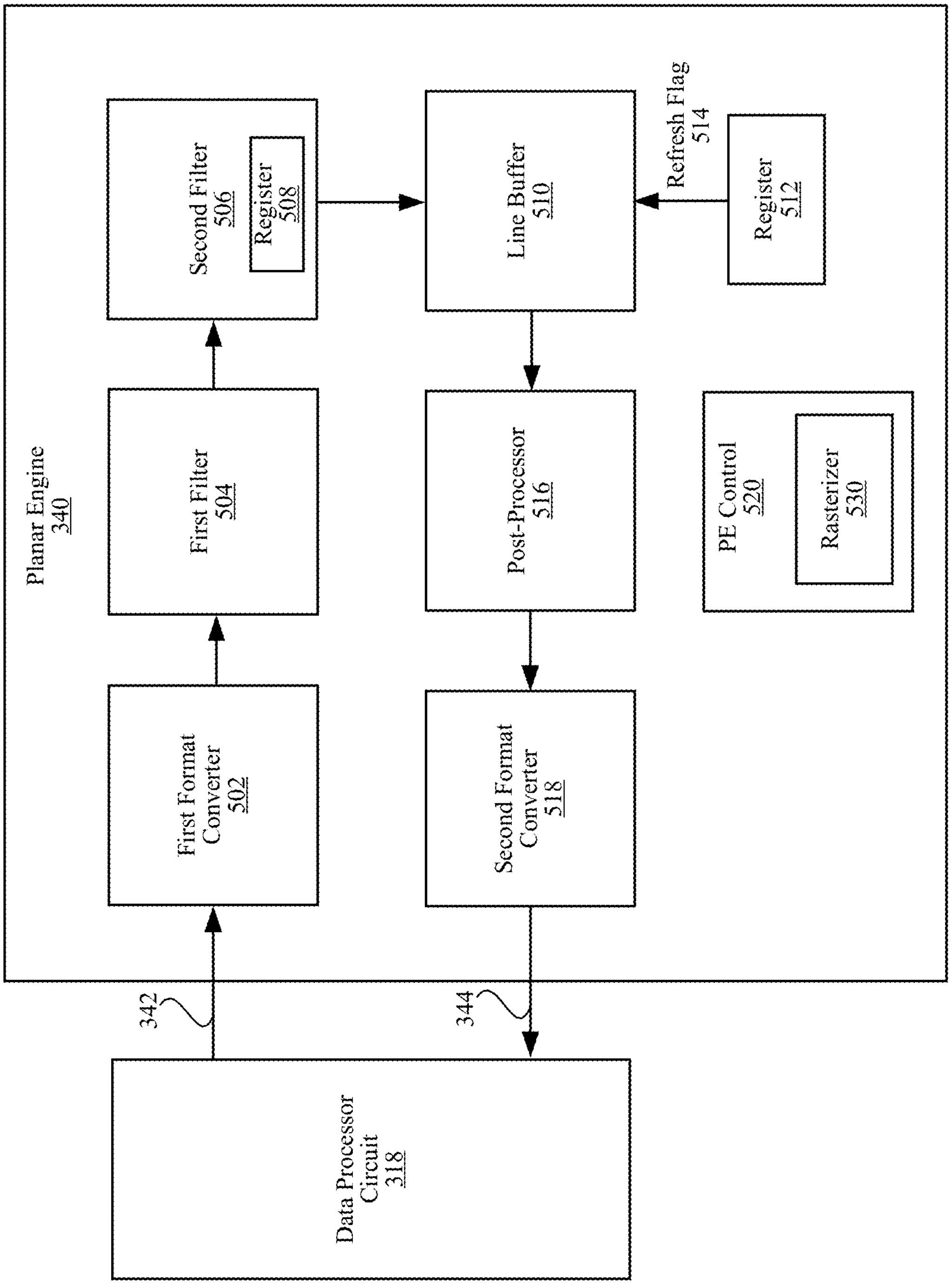
FIG. 5 is a block diagram of a planar engine in the neural processor circuit, according to one embodiment.

FIG. 5 is a block diagram of planar engine 340, according to one embodiment. Planar engine 340 is a circuit that is separated from neural engines 314 and can be programmed to perform in different modes of operations. For example, planar engine 340 may operate in a pooling mode that reduces a spatial size of data, in a reduction mode that reduces a rank of a tensor, in a gain-and-bias mode that provides a single-pass addition of bias and scaling by a scale factor, in an elementwise mode that includes elementwise operations, in some other mode, or in a mode that combines at least two of the aforementioned modes. For this purpose, planar engine 340 may include, among other components, a first format converter 502, a first filter 504, a second filter 506 (which may include a register 508), a line buffer 510, a register 512 (with a refresh flag 514), a post-processor 516, a second format converter 518, and a planar engine (PE) control 520 (includes a rasterizer 530). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operating cycle), and system memory 230 may generate or transmit different datasets that are saved in different memory locations of data processor circuit 318. Various source datasets may represent different tensors. In an operating cycle of planar engine 340, different source datasets may be fetched together as input data 342. For example, in an elementwise mode that involves the addition of two different tensors to derive a resultant tensor, input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 from one format (e.g., a format used for storing in buffer memory 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 provided to planar engine 340 can be collectively referred to herein as "a version of the input data."

First filter 504 is a circuit that performs a filtering operation in at least one direction. For this purpose, first filter 544 may include, among other components, adders, comparators, and multipliers. In the pooling mode, first filter 504 performs filtering operation in a first dimension, while second filter 506 performs filtering operation in a second dimension. In other modes, first filter 504 and second filter 506 may operate differently. In a reduction mode, for example, first filter 504 performs elementwise operations while second filter 506 functions as a reduction tree to aggregate values of data generated by first filter 504. For example, second filter 506 may include register 508 for storing values generated by the reduction tree in different operating cycles.

Second filter 506 performs one or more filtering operations, e.g., in a direction different from first filter 504. For this purpose, second filter 506 may include, among other components, adders, comparators, and multipliers. The filtering performed by second filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum or minimum values, the comparators may be used in place of the adders and the multipliers to select the maximum or minimum values.

Line buffer 510 is a memory circuit for storing result data obtained from first filter 504 and second filter 506. Line buffer 510 may store values of different image lines. In some modes, line buffer 510 is bypassed. Line buffer 510 may also include logic circuits to perform additional operations other than merely storing the result data. For example, line buffer 510 may include adder circuits, which in combination with a memory component, enables line buffer 510 to function as an accumulator that aggregates data generated from the results of first filter 504 and/or second filter 505 to separately store aggregated data of a dimension not to be reduced.

In the reduction mode, line buffer 510 stores reduced values generated by the reduction tree of second filter 506 and retains the stored reduced values for a defined number of operating cycles. The reduced values retained in line buffer 510 may be reused at post-processor 516 for multiple post-processing operations that follow the reduction operation. The reduced values may be retained in link buffer 510 for the defined number of operating cycles in accordance with a value of refresh flag 514 that configures initialization (e.g., refreshing or resetting) of link buffer 510. Refresh flag 514 may be a flag (e.g., bit) in register 512. The value of refresh flag 514 may be set by rasterizer 530, some other component of PE control 520, or can be configured by software. A first value of refresh flag 514 (e.g., bit value of "1") may configure line buffer 510 to skip an initialization (e.g., resetting) so that line buffer 510 retains the reduced values generated by second filter 506 after the reduction operation. A second value of refresh flag 514 (e.g., bit value of "0") may initiate the initialization (e.g., resetting) of line buffer 510 prior to the reduction operation performed by second filter 506. Furthermore, the second value of refresh flag 514 may initiate the initialization (e.g., resetting) of line buffer 510 after the defined number of operating cycles, e.g., before some other reduction operation to be performed by second filter 506.

Post-processor 516 is a circuit that performs further processing of values fetched from other upstream components, e.g., from line buffer 510. Post-processor 516 may include specialized circuits that are efficient at performing certain types of mathematical computations that might be inefficient to perform using a general computation circuit. Operations performed by post-processor 516 in the reduction mode may include, among others, performing square root operations, inverse of values, square root of inverse values, etc. Post-processor 516 may be bypassed in other operation modes.

Second format converter 518 is a circuit that converts the results of preceding components in planar engine 340 from one format to another format for generating output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., at least one neural engine 314).

PE control 520 is a circuit that controls operations of other components in planar engine 340 based on the operation mode of planar engine 340. Depending on the different modes of operation, PE control 520 programs register associated with the different components in planar engine 340 so that the programmed components operate in a certain manner. The pipeline of components or connections between the components in planar engine 340 may also be reconfigured. In the pooling mode, for example, data processed at by first filter 504 may be further filtered by second filter 506. In the reduction mode, however, data is processed by first filter 504, reduced at second filter 506 and then may be accumulated in line buffer 510 that is, e.g., programmed as an accumulator. In the elementwise mode, line buffer 510 may be bypassed.

PE control 520 also includes rasterizer 530 that tracks the current task or process loop being processed at planar engine 340. Rasterizer 530 is a circuit that tracks units or segments of input data and/or loops for processing the input data in planar engine 340. Rasterizer 530 may control the fetch of segments to planar engine 340 in each operating cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 530 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operating cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Example Elementwise Operation in Planar Engine

Figure 6A:
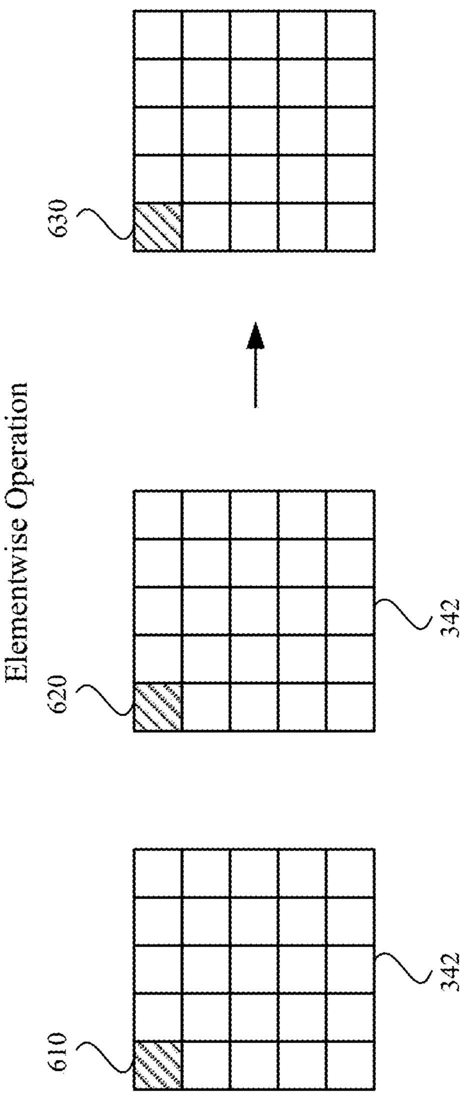
FIG. 6A is a conceptual diagram illustrating an element-wise operation, according to one embodiment.

FIG. 6A is a conceptual diagram illustrating an elementwise operation in planar engine 340, according to one embodiment. The 5×5 input data 342 of two dimensions (e.g., a rank 2 tensor) is shown only for illustration purpose. Input data 342 can be of any suitable size and ranks. Input data 342 may be the data saved in buffer memory 334 of data processor circuit 318. For example, in some cases, the data saved in buffer memory 334 fetched as input data 342 is an output of at least one neural engine 314. In other cases, the data saved in buffer memory 334 fetched as input data 342 may be the output of planar engine 340 in previous operating cycles. In yet other cases, the data saved in buffer memory 334 fetched as input data 342 may be a segment of data received from system memory 230.

In an elementwise mode as shown in FIG. 6A, one or both of first filter 504 and second filter 506 may be used to perform one or more elementwise operations while line buffer 510 and post-processor 516 may be bypassed. In the elementwise mode, planar engine 340 performs an elementwise operation of input data 342. In one or more embodiments, an elementwise operation of input data 342 may be part of the reduction mode and performed by first filter 504 while second filter 506 performs a reduction operation.

If input data 342 is received from a single source dataset, the elementwise operation is referred to as a unary elementwise operation. For example, planar engine 340 may fetch only a segment of a single tensor from data processor circuit 318. In an example unary operation, each value in input data 342 may be squared to generate an output. If input data 342 is received from two source datasets (e.g., from two datasets stored in data processor circuit 318), the elementwise operation that combines the two source datasets is referred to as a binary elementwise operation. If two tensors are added, the addition operation is a binary operation because input data 342 includes values from both source datasets that represent the two tensors. In one embodiment, planar engine 340 may support up to a ternary operation in one operating cycle.

First format converter 502 may perform various tasks including, but not limited to, transposing one or more input tensors (e.g., width-to-channel transpose), broadcasting values of the input tensors to expand the sizes and ranks of the input tensors, and performing other format conversions on input data 342. Transposing input tensor can be advantageous, among other reasons, because it allows per-channel gains or biases to be stored in a vector format. This may be more efficient in terms of hardware footprint, bandwidth and operation performance for the elementwise operations. Broadcasting values can be performed to expand the sizes of input data 342 in one or more dimensions by duplicating values of a tensor in one or more dimensions. For example, first format converter 502 may duplicate the data values of a column vector (a vector having a size equal to 1 in one dimension) to expand the size to another size. When input data 342 includes two tensors from two sources, values of one or both of the tensors may be broadcasted so that the size and ranks of the two tensors are matched for downstream elementwise operations.

One or both of first filter 504 and second filter 506 may be reconfigured to perform an elementwise operation. In a binary operation that includes two sources, the data values of the two sources may first be interleaved (e.g., $A_1$, $B_1$, $A_2$, $B_2$, etc., where $A_i$, and $B_i$ are data values from the two sources, respectively). As illustrated in FIG. 6A, value 610 of the first source is combined with the corresponding value

620 of the second source to generate value 630. First filter 504 (and/or second filter 506) performs such operation on an element-by-element basis.

Planar engine 340 may support different types of elementwise operations including, but not limited to addition, subtraction, elementwise maximum (e.g., comparing values 610 and 620), elementwise minimum, elementwise multiplication, and elementwise sum followed by squaring. The adders of first filter 504 may be set to operate in parallel to each other where the data values from two sources are interleaved and passed through the adders to generate the elementwise result. If the elementwise operation is elementwise multiplication, elementwise maximum, or elementwise minimum, the multipliers or the digital comparators in first filter 504 may be set to conduct the elementwise operation for the interleaved data values.

Second format converter 518 may perform a transpose operation to generate output data 344. The transpose operation at second format converter 518 may or may not be related to the transpose operation at first format converter 502. For example, in one case, a reversed transpose may be applied to output data 344 at second format converter 518 for a transposed tensor, but in another case a transpose that is unrelated to how the tensor was transposed at first format converter 502 may be applied at second format converter 518. Likewise, a transpose may be applied to output data 344 at second format converter 518 even though a transpose was not applied at first format converter 502.

Example Reduction Operation in Planar Engine

Figure 6B:
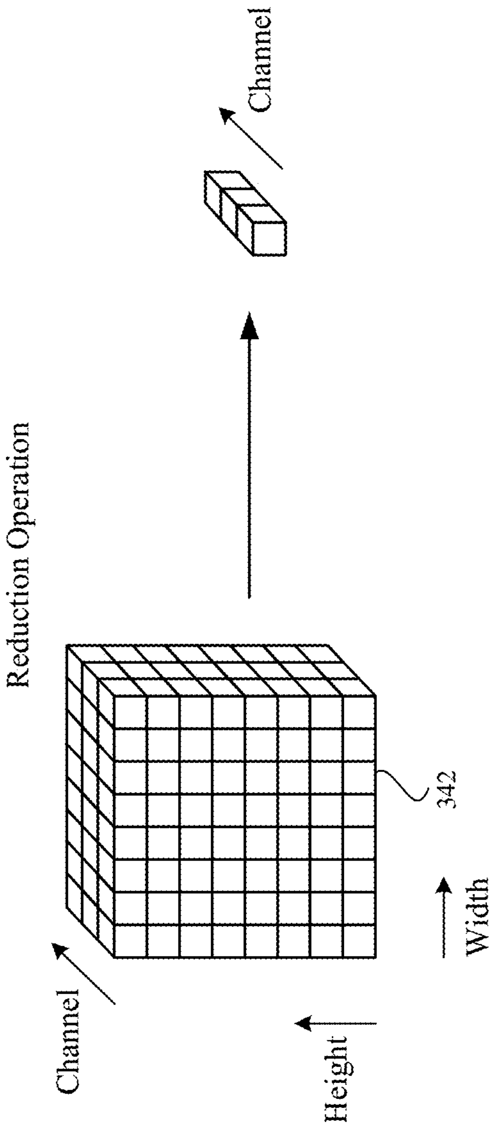
FIG. 6B is a conceptual diagram illustrating a reduction operation, according to one embodiment.

FIG. 6B is a conceptual diagram illustrating a reduction operation in planar engine 340, according to one embodiment. Planar engine 340 may perform (e.g., at the second filter 506) the reduction operation that reduces a rank or a spatial size of one or more dimensions of a tensor. As show in FIG. 6B, the reduction is performed along width and height dimensions, whereas the spatial size of channel dimension is unchanged after the reduction operation. After the reduction operation, planar engine 340 provides an output that represents a reduced tensor. For example, in one case, a rank 5 tensor may be reduced to a rank 2 tensor. In another case, a rank 3 tensor may be reduced to a rank 1 tensor (e.g., a vector), as shown in FIG. 6B. Planar engine 340 may support different types of reduction, including averaging, determining a variance, determining a standard deviation, determining the maximum (e.g., the highest value in the tensor), determining the minimum (e.g., the smallest value in the tensor), and determining a range (e.g., determining the maximum and minimum). In the reduction mode, the dimension to be reduced may be specified by an external configuration signal. Planar engine 340 processes the values in the dimension(s) that needs to be reduced to generate a reduced value (e.g., a scalar value) while maintaining the size of the dimension(s) that does not need to be reduced. In this context, a scalar value may cover both a scalar (e.g., a rank 0 tensor) and also a tensor that has a size 1 in all dimensions.

Example Reduction Operation with Retention in Planar Engine

Figure 7:
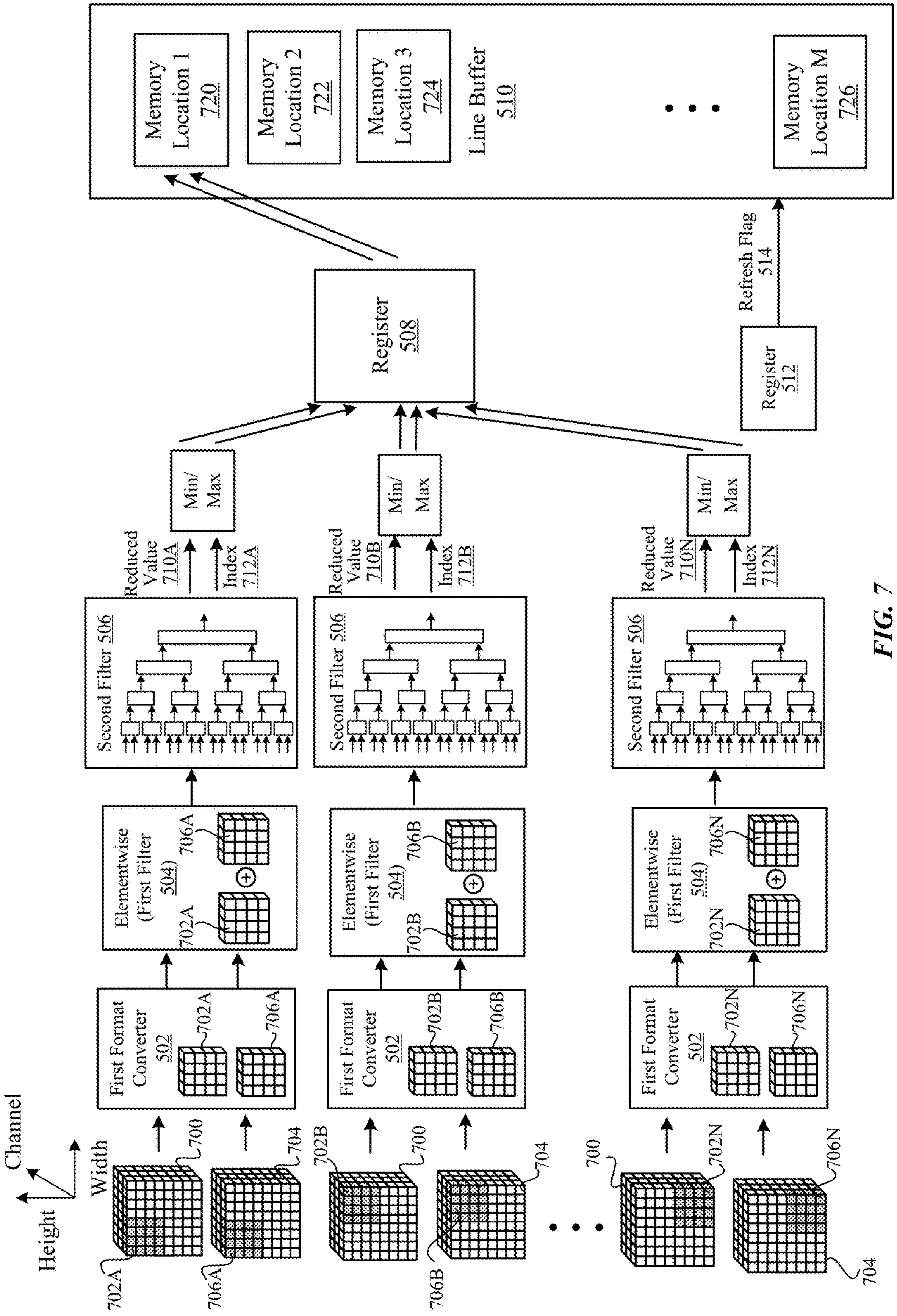
FIG. 7 is a conceptual diagram illustrating a reduction operation with retention of reduced values performed in the planar engine, according to one embodiment.
Figure 8:
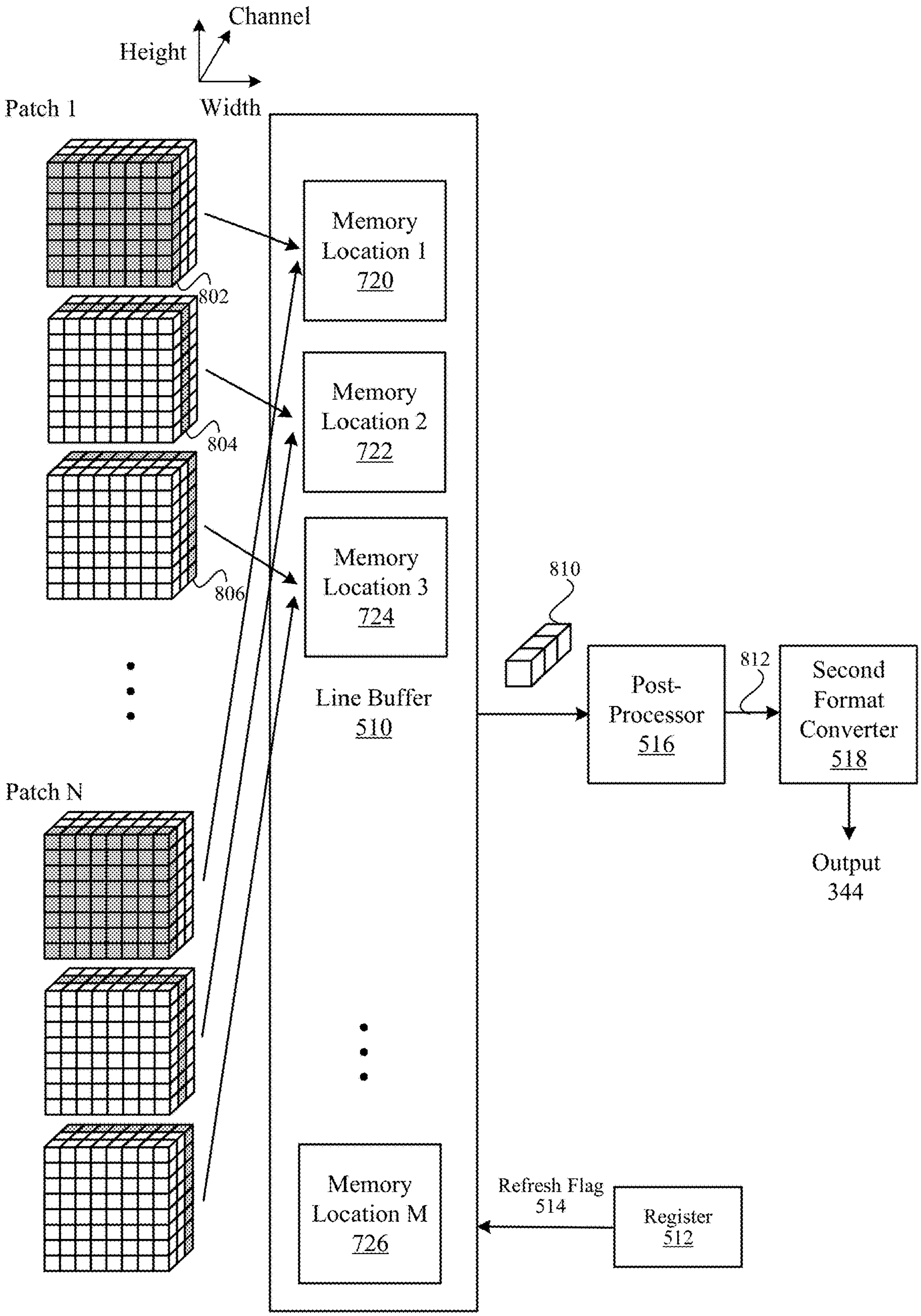
FIG. 8 is a conceptual diagram illustrating a retention operation of reduced values obtained by the reduction operation in FIG. 7, according to one embodiment.

FIG. 7 is a conceptual diagram illustrating a reduction operation with retention of reduced values performed in planar engine 340, according to one embodiment. FIG. 8 is a conceptual diagram illustrating a retention operation of reduced values obtained by the reduction operation, according to one embodiment. To explain the operations of various components of planar engine 340 in FIGS. 7 and 8, the example reduction operation is determination of per-channel minimum or maximum value while keeping track of indexing information (e.g., spatial coordinates) of per-channel minimum or maximum value (e.g., Arg Max/Min operation). In other reduction operations such as determining standard deviation, average, or variance, one or more components of planar engine 340 illustrated in FIG. 7 may be bypassed.

A dataset (e.g., tensor) to be reduced may have a size that is significantly larger than a work unit that represents the dataset of a size capable of being processed by planar engine 340 in a single operating cycle. For example, the tensor may have five or more dimensions. For ease of reference, the five dimensions may be referred to as group (G), depth (D), height (H), width (W), and channel (C). To enable fast computation and reduce the footprint of planar engine 340 and neural processor circuit 218, various components in neural processor circuit 218 may support data up to a certain number of dimensions. For example, buffer memory 334 may store data with three dimensions—width, height, and channel. A dataset stored in buffer memory 334 may also be referred to be as a "patch." A tensor with more than three dimensions (e.g., a tensor with the group and depth dimensions in addition to width, height, and channel dimensions) may be stored at buffer memory 334 as multiple patches. For planar engine 340, in an operating cycle, it also may support a tensor up to a certain size in the width and height dimensions and having a single channel dimension (e.g., a work unit may be of the size of 5×5 or 8×8 within a single channel in various embodiments). To process a patch that includes multiple channels, planar engine 340 may process multiple work units of the patch in different operating cycles. To process a tensor that is larger than a patch, planar engine 340 may process multiple patches and store results (e.g., reduced values) in line buffer 510 to generate output data 344.

A reduction operation of neural processor circuit 218 may reduce a tensor of a certain rank to another tensor of a lower rank. For the convenience of reference, the dimensions to be reduced may be referred to as width and height while the dimension not to be reduced may be referred to as channel, depth, and group. However, the names of the dimensions that are reduced or maintained are for example only. In various reduction operations, the dimensions to be reduced can be different and also the number of dimensions to be reduced may also be different. For example, for a rank 3 tensor, in one case two dimensions are reduced while the size of the remaining dimension is maintained. In another case, one dimension is reduced while the sizes of two dimensions are maintained. Also, in some cases all dimensions of a tensor may be reduced.

Referring to FIG. 7, the reduction of values within a channel of a first source dataset (referred to as a "patch" 700) and a second dataset (referred to as a "patch" 704) is illustrated, according to one embodiment. While patches 700 and 704 are shown as having a size of 8×8×3 (W×H×C), in various cases patches stored in buffer memory 334 may have different sizes. For example, in other embodiments, patches 700 and 704 may have more than 3 channels, and its width and height may also be significantly larger than 8. Although a work unit of planar engine 340 is shown as a 4×4 shaded block in FIG. 7, the size of a work unit may be different in various implementations of planar engine 340. For example, in one embodiment, a work unit has a size of 8×8.

With respect to arrangement of various components in planar engine 340, in the reduction mode, planar engine 340 may be programmed to have the sequence of first format converter 502, first filter 504, second filter 506, register 508, line buffer 510, post-processor 516, and second format converter 518. In other words, line buffer 510 may be downstream of both first filter 504 and second filter 506, unlike some other operation modes of planar engine 340.

For each operating cycle, planar engine 340 may receive a corresponding work unit of patch 700 (individually in different operating cycles referred to as work unit 702A, work unit 702B, etc., or simply work unit 702 if a particular operating cycle is not specified) as input data 342, which is of a size such as 4×4, 8×8, or another suitable number of values. Additionally, planar engine 340 may receive a corresponding work unit of patch 704 (individually in different operating cycles referred to as work unit 706A, work unit 706B, etc., or simply work unit 706 if a particular operating cycle is not specified) as additional input data 342, which is of a size such as 4×4, 8×8, or another suitable number of values. After input data 342 are fetched, first format converter 502 may perform data conversion operations that are similar to what is described above with reference to the pooling mode except that, in the reduction mode, first format converter 502 may perform one or more transpose operations.

To perform certain types of reduction such as determining minimum or maximum values, first filter 504 may be programmed to perform an elementwise operation. For example, each value in work unit 702 may be added or subtracted from a corresponding value in work unit 706. If the reduction involves an elementwise subtraction, a sign flip may be performed on values in work unit 706 and binary elementwise operations corresponding to the subtraction may be performed by first filter 504. In other reduction operations, the elementwise operations may be elementwise multiplication between each value in work unit 702 and the corresponding value in work unit 706.

Second filter 506 may be programmed to function as a reduction tree to perform a reduction operation on a version of the input data (e.g., the input data obtained by the elementwise operation at first filter 504) to reduce the values arranged in one or more dimensions of the input data into a reduced value 710 (individually in different operating cycles referred to as 710A, 710B, etc., or simply 710 if a particular operating cycle is not specified). For example, in the example shown in FIG. 7, multiple values arranged in a first dimension (width) and a second dimension (height) of the input data are processed to generate a reduced value 710. The number of dimensions being reduced may depend on commands sent to planar engine 340. Second filter 506 may further keep track of indexing information for each reduced value 710, e.g., index 712A associated with reduced value 710A, index 712B associated with reduced value 710B, etc. The indexing information for each reduced value 710 (individually in different operating cycles referred to as index 712A, index 712B, etc., or simply index 712 if a particular operating cycle is not specified) may comprise information about spatial coordinates of that reduced value 710.

The reduction tree in second filter 506 may include multiple layers of computation units that gradually aggregate the values obtained by the elementwise operation between work unit 702 and work unit 706 into reduced value 710. In one case, the aggregation may include adding the values obtained by the elementwise operation between work unit 702 and work unit 706 to generate a single aggregated value. In another case (shown in FIG. 7), the aggregation may include selecting the maximum or minimum of the values obtained by the elementwise operation between work unit 702 and work unit 706. An aggregated value, the maximum, or the minimum may be referred to as a reduced value. Different computation units in second filter 506 may be used depending on the type of reduction operation. For example, if the reduction operation is to determine the average, variance, or standard deviation of values in a tensor, adders may be the computation units used within second filter 506. If the reduction operation is to determine the maximum or minimum value (which is the case in FIG. 7), comparators may be the computation units used within second filter 506. The input layer of the reduction tree in second filter 506 may include the most number of computation units and the number of computation units in each subsequent layer is progressively reduced. For example, if each work unit includes 64 data values, the input layer may include 32 computation units, a second layer may include half of the computation units (e.g., 16 units), a third layer may have a further reduced number of computation units (e.g., 8 units), etc. The reduction tree in second filter 506 continues to aggregate the values until a single computation unit at the output layer to compute reduced value 710.

One or more intermediate values such as reduced value 710 generated by the reduction tree of second filter 506 for a currently processed work unit in a channel may be stored at register 508 of planar engine 340. Reduced value 710 stored at register 508 is a maximum (or minimum) among all reduced values 710 associated with work units in the channel that have been proceed so far. Register 508 may be part of second filter 506 or may be a separate component. FIG. 7 illustrates the reduction of multiple work units (after elementwise operation at first filter 504) in different operating cycles for a single channel (e.g., the first channel) in patches 700, 704. In a first operating cycle, values of work unit 702A of patch 700 and values of work unit 706A of patch 704 are processed through the elementwise operation at first filter 504 and reduced to reduced value 710A and saved in register 508. In a second operating cycle, values of work unit 702B within the same channel of patch 700 and values of work unit 706B within the same channel of patch 704 are fetched to planar engine 340 and reduced to reduced value 710B. Second reduced value 710B is compared to reduced value 710A and a smaller of these two values (if a minimum is being determined) is stored at register 508, along with its indexing information. Similarly, if a maximum is being determined, a larger of these two values is stored at register 508, along with its indexing information. The reduction operations continue until all work units in the patch are covered. At that point, register 508 stores the minimum (or maximum) across all work units in the patch (reduced value 710), as well as indexing information (index 712) associated with stored reduced value 710.

In the reduction mode, line buffer 510 is programmed downstream of first filter 504, second filter 506 and register 508. Line buffer 510 may include multiple memory locations such as first memory location 720, second memory location 722, third memory location 724, and M-th memory location 726. Within a channel of patches 700 and 704, reduced values 710 are being stored at register 508 and the last stored reduced value 710 and its index 712 may be transferred to one of the memory locations of line buffer 510 before another channel is processed. For example, reduced value 710 and its index 712 corresponding to the first channel are saved in first memory location 720 while reduced values 710 of other channels along with their indexes 712 are saved in other memory locations.

Line buffer 510 may retain the stored reduced values 710 at first memory location 720, second memory location 722, third memory location 724, and M-th memory location 726 for a defined number of operating cycles in accordance with a first value (e.g., bit value of "1") of refresh flag 514. Furthermore, in accordance with the first value of refresh flag 514, line buffer 510 may retain corresponding indexing information (e.g., indexes 712) associated with each reduced value 710 for the defined number of operating cycles (e.g., at first memory location 720, second memory location 722, third memory location 724, and M-th memory location 726). Reduced values 710 and indexes 712 retained at line buffer 510 for the defined number of operating cycles may be reused at post-processor 516 for more than one post-processing operation (e.g., square root of reduced values 710, inverse of reduced values 710, inverse of square root of reduced values 710, etc.). In this manner, the need to perform multiple reduction operations at planar engine 340 (e.g., at second filter 506) on the same input data 342 for usage by different post-processing operations at post-processor 516 is avoided, which substantially improves performance and decreases power consumption at planar engine 340.

Note that a second value of refresh flag 514 (e.g., bit value of "0") may initiate an initialization (e.g., resetting) of line buffer 510 prior to the reduction operation performed at the second filter 506. On the other hand, the first value of refresh flag 514 (e.g., bit value of "1") may configure line buffer 510 to skip the initialization and retain the reduced values 710 (along with corresponding indexes 712) for multiple post-processing operations performed at post-processor 516 after the reduction operation performed at the second filter 506. In some embodiments, while reduced value 710 (and indexes 712) are retained at line buffer 510 for the defined number of operating cycles, second filter 506 may perform at least one reduction operation following the reduction operation. The at least one reduction operation may include one or more operations that do not affect reduced values 710 that are retained in line buffer 510. For example, the at least one reduction operation not affecting reduced values 710 retained in line buffer 510 can be, e.g., summations with zero when the reduction operation is summation, comparison with a largest value supported in planar engine 340 (e.g., +Inf value) when the reduction operation is selection of a minimum value, comparison with a smallest value supported in planar engine 340 (e.g., −Inf value) when the reduction operation is selection of a minimum value.

Referring to FIG. 8, planar engine 340 may perform reduction operations across multiple patches. For example, a tensor to be reduced (e.g., after the elementwise operation at first filter 504) not only may include multiple channels, but also may be in a size that is larger than a patch. Multiple patches (patch 1, patch 2, . . . patch N) are stored in buffer memory 334 to represent the larger tensor. The tensor may include M channels and each patch may have the same number of channels. For example, in FIG. 8, the tensor and its corresponding patches have 3 channels. Planar engine 340 may include M memory locations (720, 722, 724, . . . , 726) in line buffer 510. Planar engine 340 may support a reduction operation of a tensor up to M channels. For example, in one embodiment, M may be equal to 192, but another number of M is also possible, depending on the hardware footprint allocated to line buffer 510.

Planar engine 340 may process data patch by patch to reduce one or more dimensions of the tensor. In the example shown in FIG. 8, the size of the width and height dimensions is to be reduced while the size of the dimension channel is to be maintained. For first channel 802 in patch 1, planar engine 340 may use the process illustrated in FIG. 7 to process the values in first channel 802 to a first reduced value (and first indexing information) and save the first reduced value (and the first indexing information) in first memory location 720. For second channel 804 in the patch 1, planar engine 340 may receive input data (e.g., one or more work units) within second channel 804. Planar engine 340 may repeat the process illustrated in FIG. 7 to perform the reduction operation to generate a second reduced value (and second indexing information). Planar engine 340 may store the second reduced value (and the second indexing information) in second memory location 722. Likewise, for patch 1, planar engine 340 may repeat the process illustrated in FIG. 7 for the values in third channel 806 and save the third reduced value (and the third indexing information) in third memory location 724. If a patch has more than 3 channels, the process may continue and the reduced values (along with the corresponding indexing information) may be saved in additional memory locations of line buffer 510.

The process of reducing various values and saving the reduced values (along with the indexing information) corresponding to different channels (or in general a dimension that is not reduced) to different memory locations of line buffer 510 may be repeated for one or more patches until patch N is processed. For a reduced value and its indexing information that correspond to the same channel in the tensor but that are generated by different patches, this reduced value and its indexing information are stored in the same memory location. For example, the reduced value and its indexing information corresponding to the first channel in patches 1, 2, . . . , N are stored in first memory location 720. For reduced values and corresponding indexing information that correspond to different channels in the tensor, those reduced values and corresponding indexing information are stored in different memory locations. For example, the reduced value and its indexing information corresponding to the second channel in patches 1, 2, . . . , N are stored in second memory location 722; the reduced value and its indexing information corresponding to the third channel in patches 1, 2, . . . , N are stored in third memory location 724, etc.

A reduced value (and corresponding indexing information) stored in a memory location in line buffer 510 dedicated for a channel is a result of reduction operation between a new reduced value (e.g., from a new patch k) stored in register 508 and a reduced value previously stored the memory location in line buffer 510 (a reduced value related to one or more previously-reduced patches in the channel). For example, if the reduction operation is Arg Max operation, the operations as in the following pseudocode are performed:

if PatchReduction.value>Buffer[channel].value, then
Buffer[channel].value=PatchReduction.value, and
Buffer[channel].index=PatchReduction.index.

If the reduction operation is Sum (summation) operation, then

Buffer[channel].value=Buffer[channel].value+ PatchReduction.value.

PatchReduction is a content of register 508 after reducing all the work units in a patch for the specific channel, PatchReduction.value is reduced value 710 stored in register 508, PatchReduction.index is index 712 stored in register 508, Buffer[channel] is a memory location in line buffer 510 for the channel (e.g., first memory location 720 for the first channel, second memory location 722 for the second channel, etc.), Buffer[channel].value is reduced value 710 stored in the memory location, and Buffer

[channel].index is index 712 stored in the memory location. It can be observed that content from register 508 is not merely stored in line buffer 510, but content from register 508 is conditionally stored (e.g., in the case of Arg Max/Min reduction operation) or accumulated (e.g., in the case of Sum reduction operation).

Refresh flag 512 can be treated as an extension of the aforementioned reduction operations associated with contents in register 508 and a memory location in line buffer 510. For example, if Refresh flag 512 indicates initialization of line buffer 510 and the first patch in a channel is currently being reduced, then the reduction step between content of register 508 and content of the memory location in line buffer 510 is replaced with initialization of the memory location in line buffer 510. Therefore, in such case, Buffer [channel].value=PatchReduction.value, and Buffer[channel] .index=PatchReduction.index. In other words, the memory location in line buffer 510 is initialized with content of register 508 that stores a result of reduction operations across all work units in the first patch in the channel. On the other hand, if Refresh flag 512 does not indicate initialization of line buffer 510 and/or the first patch in the channel is not currently being reduced, then the reduction operation is performed between content of register 508 (a new reduced value for a new patch in the channel) and content of the memory location in line buffer 510 (a previous reduced value related to one or more previously-reduced patches in the channel).

Referring to FIG. 8A, a channel vector 810 may include reduced values (and their indexing information) that are stored in different memory locations in line buffer 510. Channel vector 810 may have the same number of channels as the tensor (e.g., the source dataset) being reduced. Channel vector 810 may be a reduced tensor that maintains a size of the channel of the original tensor. For example, since in FIG. 8 the original tensor being reduced has 3 channels, channel vector 810 also has 3 channels. Values in other dimensions of the original tensor are processed and reduced to a single value.

Post-processor 516 may perform certain mathematical computations that may be inefficient to perform using a general computation circuit. Such operation may involve, for example, determining the square root of the values (e.g., used in determining standard deviations). For this purpose, post-processor 516 may include a circuit that computes a square root of floating-point numbers. Post-processor 516 may also include a circuit that performs an inversion on a number in a format of higher precision than the format of output data 344. In another example, post-processor 516 may include a multiplier that scales the accumulated values to generate an average value. Post-processor 516 may include other circuits for performing various operations associated with reduction operations. Post-processor 516 may perform a first post-processing operation on channel vector 810 to generate a first batch of an output vector 812. The first batch of output vector 812 may be passed onto second format converter 518 to generate a first batch of output data 344 for storage into data processor circuit 318. Following the first post-processing operation, post-processor 516 may perform a second post-processing operation on the same channel vector 810 (as reduced values 710 and indexes 712 are retained in line buffer 510) to generate a second batch of output vector 812. The second batch of output vector 812 may be passed onto second format converter 518 to generate a second batch of output data 344 for storage into data processor circuit 318.

The operations and functions of second format converter 518 in the reduction mode are similar to what was described above with reference to the pooling mode, except that a value in output vector 812 may be repeated along one or more dimensions and the generated reduced tensor may be reshaped. For example, input data may be reshaped in first format converter 502 to put data values that are not reduced into a single dimension. After the reduction operation, a reduced tensor may be reshaped to another tensor that has a different size or rank. The reshaped tensor may have the dimensionality that is the same as the input data. Output data 344 of planar engine 340 may be a scalar value, a reduced tensor, or a reshaped reduced tensor. Output data 344 may include a version of one or more reduced values. For example, in FIG. 8, output data 344 is a 1×1×3 tensor because the width and height dimensions are reduced to one while the size of the channel dimension is maintained. A version of a reduced value may be the original value of the reduced value, an accumulated version of the reduced value, a reduced value with format changes.

Neural processor circuit 218 may perform one or more transpose operations to convert dimensions of a tensor that need to be reduced to width and height. For example, neural processor circuit 218 may perform suitable re-sizing operations to fold two or more dimensions that do not need to be reduced into one dimension. For example, data may be stored in buffer memory 334 as a 3-dimensional tensor (W, H, C) and, in one case, data are to be reduced with respect to only the width dimension but not the height or the channel dimension. The values arranged in height and channel dimension may be folded into a single dimension that may be called a composite dimensional so that the input data of planar circuit 340 is a 2-dimensional tensor (W dimension and the composite H×C dimension). In turn, width dimension may be reduced in planar circuit 340 while the size of the composite dimension is maintained. The values in the output may be reshaped back to 3 dimensions. The rasterizers in neural processor circuit 218, such as rasterizer 540 of planar engine 340, may keep track of the transpose operations so that the reduced tensor may be transposed again to the right dimensions.

Example Processes at Neural Engine Architecture

Figure 9:
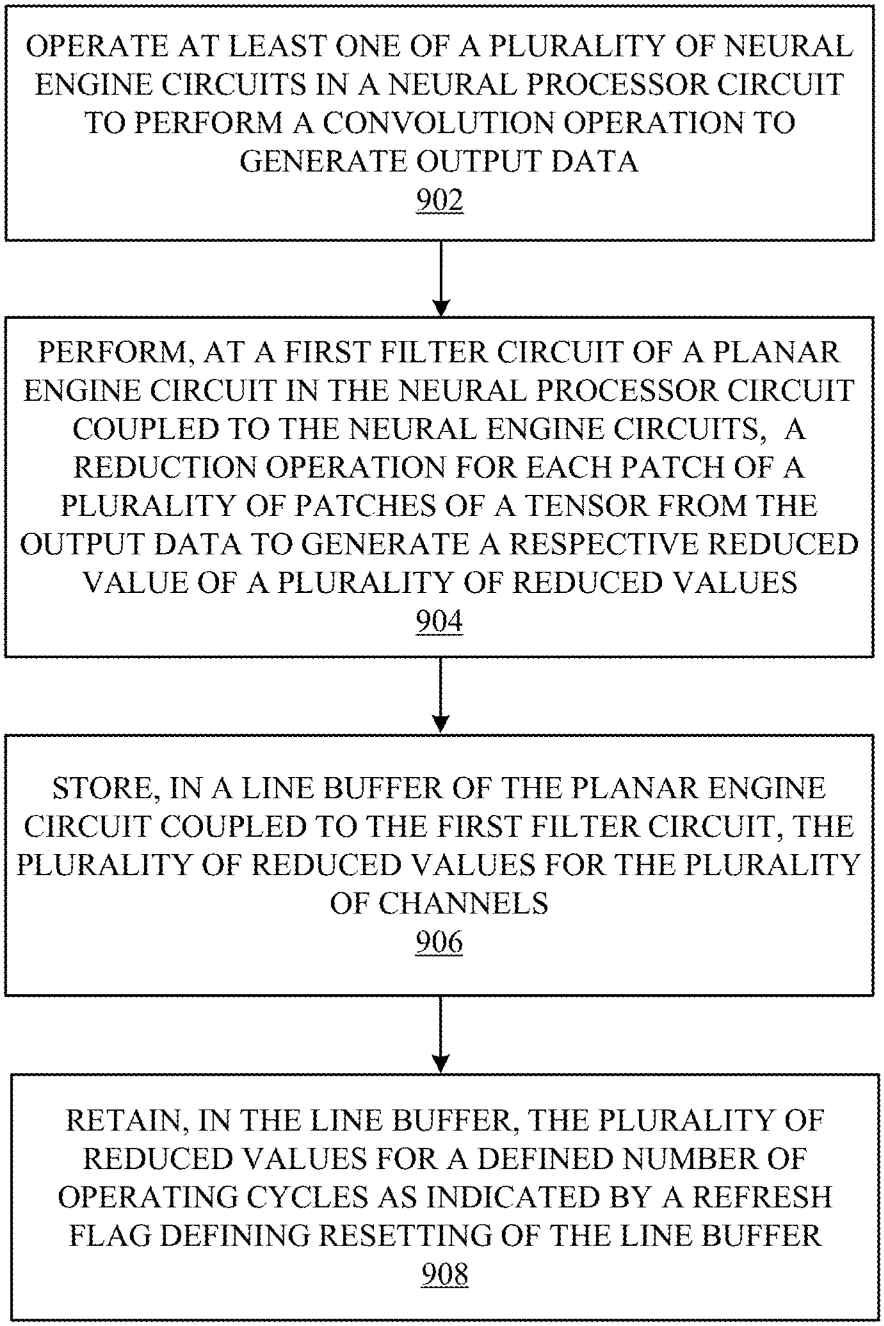
FIG. 9 is a flowchart illustrating a method of performing a reduction operation with retention in the neural processor circuit, according to one embodiment.

FIG. 9 is a flowchart illustrating a method of performing a reduction operation with retention in a neural processor circuit, according to one embodiment. The neural processor circuit operates 902 at least one of neural engine circuits (e.g., at least neural engine 314) in the neural processor circuit to perform a convolution operation to generate output data (e.g., output data 328).

The neural processor circuit performs 904 (e.g., at second filter circuit 504) a reduction operation for each patch of multiple patches of a tensor from the output data to generate a respective reduced value of multiple reduced values that is associated with a corresponding channel of multiple channels of the tensor. The neural processor circuit stores 906 (e.g., in line buffer 510) the reduced values for the multiple channels of the tensor. The neural processor circuit retains 908 (e.g., in line buffer 510) the reduced values for a defined number of operating cycles as indicated by a refresh flag (e.g., refresh flag 514) defining resetting of, e.g., line buffer 510. In this manner, the neural processor circuit achieves the desired retention of the reduces values to be re-used for multiple post-processing operations (e.g., at post-processor 516).

Embodiments of the process as described above with reference to FIG. 9 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:

a plurality of neural engine circuits comprising a first neural engine circuit and a second neural engine circuit, at least one of the plurality of neural engine circuits configured to perform a convolution operation to generate output data;

a planar engine circuit that is separated from and coupled to the plurality of neural engine circuits including the first neural engine circuit and the second neural engine circuit, the planar engine circuit including:

a first filter circuit configured to perform a reduction operation to reduce a patch tensor of a first rank to another tensor of a second rank lower than the first rank by removing one or more dimensions of the patch tensor of the first rank for each patch of a plurality of patches of a tensor for a dataset of an input data originating from the output data to generate a respective reduced value of a plurality of reduced values, the respective reduced value associated with a corresponding channel of a plurality of channels of the tensor for the dataset, the respective reduced value being generated based on values of elementwise operations between a first work unit of each patch and a second work unit of another patch, wherein the tensor of the input data comprises more than 3 dimensions and the plurality of patches, at least one patch of the plurality of patches includes 3 dimensions and a plurality of work units, and at least one work unit of the plurality of work units represents the dataset of a size capable of being processed by the planar engine circuit in a single operating cycle;

a second filter circuit coupled to the first filter circuit, the second filter circuit configured to:

receive a first tensor and a second tensor as part of the output data; and perform an elementwise operation between the first tensor and the second tensor to generate the tensor for the first filter circuit; and a line buffer coupled to the first filter circuit, the line buffer configured to:

store the plurality of reduced values for the plurality of channels being transferred from one or more registers within the first filter circuit, and retain the plurality of reduced values for a defined number of operating cycles as indicated by a refresh flag stored in another register external to the first filter circuit and defining resetting of the line buffer; and a data processor circuit coupled to the planar engine circuit and the plurality of neural engine circuits, the data processor circuit configured to:

store the output data obtained from at least one neural engine circuit; and send the output data to the planar engine circuit, the output data comprising the dataset as the input data for the plurality of patches and the plurality of channels of the tensor.

2. The neural processor circuit of claim 1, wherein the planar engine circuit further comprises a post-processor circuit coupled to the line buffer, the post-processor circuit configured, during the defined number of operating cycles, to:

perform a first post-processing operation on a channel vector comprising the plurality of reduced values from the line buffer to generate a first output vector; and perform a second post-processing operation on the channel vector following the first post-processing operation to generate a second output vector.

3. The neural processor circuit of claim 1, wherein each patch comprises a first number of work units, the respective reduced value being stored in the one or more registers within the first filter circuit configured to store the plurality of reduced values generated in a second number of work units before the respective reduced value being transferred to the line buffer, wherein the first number is same as the second number.

4. The neural processor circuit of claim 1, wherein:

the first filter circuit is further configured to determine indexing information for each reduced value of the plurality of reduced values; and the line buffer is further configured to:

store the indexing information for each reduced value, and retain the indexing information for the defined number of operating cycles as indicated by the refresh flag.

5. The neural processor circuit of claim 4, wherein the indexing information for each reduced value comprises information about spatial coordinates of that reduced value in the tensor.

6. The neural processor circuit of claim 1, wherein the first filter circuit is further configured to:

perform the reduction operation by finding a respective minimum value or a respective maximum value for a corresponding channel of the plurality of channels of the tensor for the dataset; and determine corresponding indexing information for the respective minimum value or the respective maximum value.

7. The neural processor circuit of claim 6, wherein the line buffer is further configured to:

store the respective minimum value or the respective maximum value and the corresponding indexing information; and retain the respective minimum value or the respective maximum value and the corresponding indexing information for the defined number of operating cycles as indicated by the refresh flag.

8. The neural processor circuit of claim 1, wherein:

a first value of the refresh flag initiates an initialization of the line buffer prior to the reduction operation; and a second value of the refresh flag configures the line buffer to skip the initialization and retain the plurality of reduced values for a plurality of post-processing operations performed after the reduction operation.

9. The neural processor circuit of claim 1, wherein the first filter circuit is further configured to:

perform, during the defined number of operating cycles, at least one reduction operation following the reduction operation, the at least one reduction operation comprises operations not affecting the plurality of reduced values retained in the line buffer for the defined number of operating cycles.

10. A method of operating a neural processor circuit, comprising:

operating at least one of a plurality of neural engine circuits comprising a first neural engine circuit and a second neural engine circuit in the neural processor circuit to perform a convolution operation to generate output data;

performing, at a first filter circuit of a planar engine circuit in the neural processor circuit that is separated from and coupled to the plurality of neural engine circuits comprising the first neural engine circuit and the second neural engine circuit, a reduction operation to reduce a patch tensor of a first rank to another tensor of a second rank lower than the first rank by removing one or more dimensions of the patch tensor of the first rank for each patch of a plurality of patches of a tensor for a dataset of an input data originating from the output data to generate a respective reduced value of a plurality of reduced values, the respective reduced value associated with a corresponding channel of a plurality of channels of the tensor for the dataset, the respective reduced value being generated based on values of elementwise operations between a first work unit of each patch and a second work unit of another patch, wherein the tensor of the input data comprises more than 3 dimensions and the plurality of patches, at least one patch of the plurality of patches includes 3 dimensions and a plurality of work units, and at least one work unit of the plurality of work units represents the dataset of a size capable of being processed by the planar engine circuit in a single operating cycle;

storing, in a line buffer of the planar engine circuit coupled to the first filter circuit, the plurality of reduced values for the plurality of channels being transferred from one or more registers within the first filter circuit;

receiving, at a second filter circuit of the planar engine circuit coupled to the first filter circuit, a first tensor and a second tensor as part of the output data;

performing, at the second filter circuit, an elementwise operation between the first tensor and the second tensor to generate the tensor for the first filter circuit;

retaining, in the line buffer, the plurality of reduced values for a defined number of operating cycles as indicated by a refresh flag stored in another register external to the first filter circuit and defining resetting of the line buffer;

storing, at a data processor circuit coupled to the planar engine circuit and the plurality of neural engine circuits, the output data obtained from at least one neural engine circuit; and sending the output data from the data processor circuit to the planar engine circuit, the output data comprising the dataset as the input data for the plurality of patches and the plurality of channels of the tensor.

11. The method of claim 10, further comprising:

performing, at a post-processor circuit of the planar engine circuit coupled to the line buffer, a first post-processing operation on a channel vector comprising the plurality of reduced values from the line buffer to generate a first output vector; and performing, at the post-processor circuit, a second post-processing operation on the channel vector following the first post-processing operation to generate a second output vector.

12. The method of claim 10, wherein each patch comprises a first number of work units, the respective reduced value being stored in the one or more registers within the first filter circuit configured to store the plurality of reduced values generated in a second number of work units before the respective reduced value being transferred to the line buffer, wherein the first number is same as the second number.

13. The method of claim 10, further comprising:

determining, at the first filter circuit, indexing information for each reduced value that comprises information about spatial coordinates of that reduced value in the tensor;

storing, in the line buffer, the indexing information for each reduced value; and retaining, in the line buffer, the indexing information for the defined number of operating cycles as indicated by the refresh flag.

14. The method of claim 10, further comprising:

performing the reduction operation by finding a respective minimum value or a respective maximum value for a corresponding channel of the plurality of channels of the tensor; and determining corresponding indexing information for the respective minimum value or the respective maximum value.

15. The method of claim 14, further comprising:

storing, in the line buffer, the respective minimum value or the respective maximum value and the corresponding indexing information; and retaining the respective minimum value or the respective maximum value and the corresponding indexing information in the line buffer for the defined number of operating cycles as indicated by the refresh flag.

16. The method of claim 10, further comprising:

initiating an initialization of the line buffer prior to the reduction operation using a first value of the refresh flag;

configuring, using a second value of the refresh flag, the line buffer to skip the initialization and retain the plurality of reduced values for a plurality of post-processing operations performed after the reduction operation; and performing, at the first filter circuit during the defined number of operating cycles, at least one reduction operation following the reduction operation, the at least one reduction operation comprises operations not affecting the plurality of reduced values retained in the line buffer for the defined number of operating cycles.

17. An electronic device, comprising:

a system memory storing input data; and a neural processor circuit coupled to the system memory, the neural processor circuit including:

a data processor circuit configured to receive the input data from the system memory, a plurality of neural engine circuits comprising a first neural engine circuit and a second neural engine circuit coupled to the data processor circuit, at least one of the plurality of neural engine circuits configured to perform a convolution operation on the input data to generate output data for storage into the data processor circuit, and a planar engine circuit that is separated from and coupled to the plurality of neural engine circuits comprising the first neural engine circuit and the second neural engine circuit, and further coupled to the data processor circuit, the planar engine circuit including:

a first filter circuit configured to perform a reduction operation to reduce a patch tensor of a first rank to another tensor of a second rank lower than the first rank by removing one or more dimensions of the patch tensor of the first rank for each patch of a plurality of patches of a tensor for a dataset of the input data originating from the output data to generate a respective reduced value of a plurality of reduced values, the respective reduced value being associated with a corresponding channel of a plurality of channels of the tensor for the dataset, the respective reduced value being generated based on values of elementwise operations between a first work unit of each patch and a second work unit of another patch, wherein the tensor of the input data comprises more than 3 dimensions and the plurality of patches, at least one patch of the plurality of patches includes 3 dimensions and a plurality of work units, and at least one work unit of the plurality of work units represents the dataset of a size capable of being processed by the planar engine circuit in a single operating cycle;

a second filter circuit coupled to the first filter circuit, the second filter circuit configured to:

receive a first tensor and a second tensor as part of the output data; and perform an elementwise operation between the first tensor and the second tensor to generate the tensor for the first filter circuit; and a line buffer coupled to the first filter circuit, the line buffer configured to:

store the plurality of reduced values for the plurality of channels being transferred from one or more registers within the first filter circuit, and retain the plurality of reduced values for a defined number of operating cycles as indicated by a refresh flag stored in another register external to the first filter circuit and defining resetting of the line buffer; and wherein the data processor circuit is configured to:

store the output data obtained from at least one neural engine circuit; and send the output data to the planar engine circuit, the output data comprising the dataset as the input data for the plurality of patches and the plurality of channels of the tensor.

18. The electronic device of claim 17, wherein the planar engine circuit further comprises a post-processor circuit coupled to the line buffer and the data processor circuit, the post-processor circuit configured, during the defined number of operating cycles, to:

perform a first post-processing operation on a channel vector comprising the plurality of reduced values from the line buffer to generate a first output vector for storage into the data processor circuit; and perform a second post-processing operation on the channel vector following the first post-processing operation to generate a second output vector for storage into the data processor circuit.

19. The electronic device of claim 17, wherein each patch comprises a first number of work units, the respective reduced value being stored in the one or more registers within the first filter circuit configured to store the plurality of reduced values generated in a second number of work units before the respective reduced value being transferred to the line buffer, wherein the first number is same as the second number.

20. The electronic device of claim 17, wherein:

the first filter circuit is further configured to determine indexing information for each reduced value of the plurality of reduced values; and the line buffer is further configured to:

store the indexing information for each reduced value, and retain the indexing information for the defined number of operating cycles as indicated by the refresh flag.

* * * * *